United States Patent [19]

Perry

[11] 4,238,204

[45] Dec. 9, 1980

[54] SELECTIVE ADSORPTION PROCESS

[75] Inventor: Eli Perry, St. Louis, Mo.

[73] Assignee: Monsanto Company, St. Louis, Mo.

[21] Appl. No.: 49,516

[22] Filed: Jun. 18, 1979

[51] Int. Cl.³ .................. B01D 53/04; B01D 53/22
[52] U.S. Cl. ................................. 55/16; 55/62;
    55/68; 55/74; 55/158; 55/179; 55/387
[58] Field of Search ............... 55/16, 25, 26, 58, 62,
    55/66, 68, 74, 75, 158, 179, 374, 375, 387

[56] References Cited

U.S. PATENT DOCUMENTS

| 3,141,748 | 7/1964 | Hoke et al. | 55/25 |
| 3,142,547 | 7/1964 | Marsh et al. | 55/26 |
| 3,336,730 | 8/1967 | McBride et al. | 55/16 |
| 3,430,418 | 3/1969 | Wagner | 55/25 |
| 3,702,525 | 11/1972 | Simon et al. | 55/25 |
| 3,838,553 | 10/1974 | Doherty | 55/66 X |
| 4,180,552 | 12/1979 | Graham et al. | 55/16 X |
| 4,181,675 | 1/1980 | Makin et al. | 55/16 X |

*Primary Examiner*—Robert H. Spitzer
*Attorney, Agent, or Firm*—Thomas B. Leslie; James W. Williams, Jr.; Stanley M. Tarter

[57] ABSTRACT

There is provided an improved selective adsorption process for the recovery of a light gas, especially hydrogen, from a feed gas mixture by utilizing a membrane permeator unit selectively permeable to said light gas to recover a more concentrated light gas from a stream comprising said light gas used to regenerate a selective adsorber unit and recycling the concentrated light gas to the selective adsorber unit, either blended with the feed gas mixture or as purging gas, for recovery of an added proportion of highly purified light gas product, and the system of apparatus for effecting the improved selective adsorption process.

29 Claims, 1 Drawing Figure

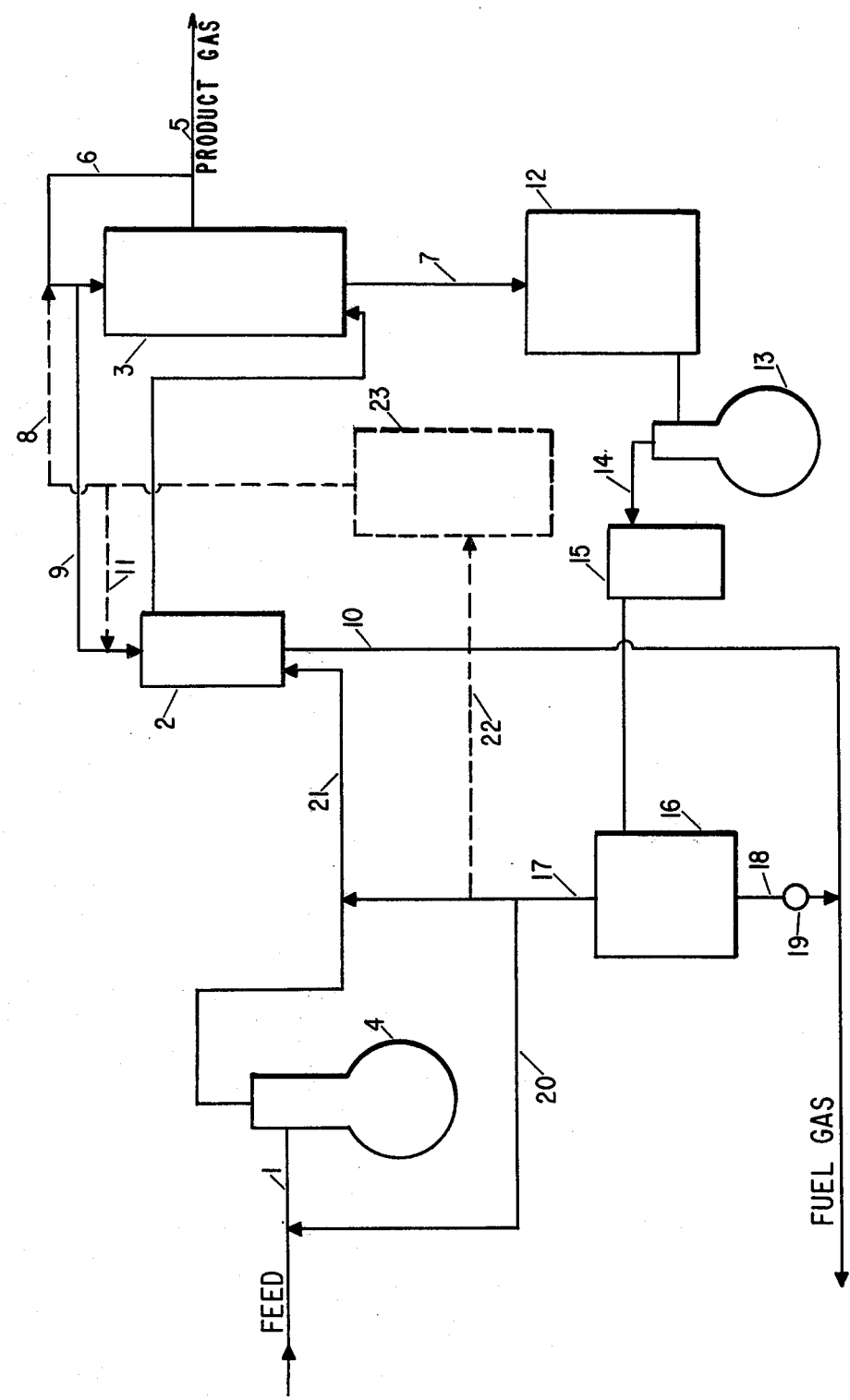

SELECTIVE ADSORPTION PROCESS

BACKGROUND OF THE INVENTION

This invention relates to a process for the separation of components of gaseous mixtures, and particularly relates to an improved selective adsorption process for the separation of high purity light gases, especially hydrogen or helium.

Cyclic swing adsorption or pressure swing adsorption referred to herein as selective adsorption has been widely used for the recovery of lighter, less sorbed gases from a mixture with one or more heavier, more readily adsorbed gases.

The light gas desired in relatively more purified form is frequently hydrogen. Such hydrogen may be recovered from various hydrogen-containing gas mixtures such as purge streams from various synthesis processes involving hydrogen as a reactant, such as hydrogenations, syntheses of ammonia or hydrocarbons, or as a product or by-product, such as dehydrogenation reactions as well as gas mixtures produced by the controlled combustion or reforming of hydrocarbons or from cracking of hydrocarbon feedstock. Another light gas which also is recovered in more purified form by the use of selective adsorption is helium which can be recovered from helium-containing natural gas compositions.

Selective adsorption systems generally involve passage of the feed gas mixture through equipment comprising two or more adsorbers containing beds of molecular sieves or other adsorbents for the heavier components of the gas mixture. The selective adsorbers are arranged to operate in sequence with suitable lines, valves, timers and the like so there are established an adsorption period during which the heavier components of the feed gas mixture are adsorbed on the molecular sieve or other adsorbent and a regeneration period during which the heavier components are desorbed and purged from the adsorbent to regenerate it for reuse. Those selective adsorption processes which operate by cycling from low temperatures to high temperatures utilize a period of cooling gas flow to restore adsorption conditions. The more frequently employed pressure cycled processes utilize a repressuring period during which the adsorber is brought substantially to adsorption period pressure.

There are frequently added one or more guard adsorbers upstream from the primary selective adsorbers containing an adsorbent or adsorbents, which may differ from the primary selective adsorbent, used to adsorb any unusually heavy contaminants in a feed gas mixture which might tend to inactivate the primary adsorbent or render it difficult to regenerate, including such as vapors or normally liquid hydrocarbons and the like. The regeneration or purging of the primary selective adsorbers and the guard adsorbers in earlier adsorption processes was generally carried out by recycling at a lower pressure or at a higher temperature a part of the product purified light gas. Such processes of selective adsorption have been widely described in the literature and are familiar to those skilled in the art.

Although these selective adsorption processes are effective to product a relatively highly purified light gas product, they suffer from disadvantages. The greatest disadvantage is the relatively low percentage recoveries which are generally encountered when a substantial part of the light gas product is used for the regeneration of the primary adsorbers and/or guard adsorbers. Recoveries of hydrogen gas generally range from about 50 to about 80%. A further disadvantage is the fact that the substantial portion of the light gas product used for regeneration of the primary adsorbers and guard adsorbers cannot be economically recovered from the regenerating gas mixtures and such mixtures including the components separated by the guard adsorbers and primary adsorbers are generally disposed of by venting, flaring or employing as low grade fuels.

Subsequently improved selective adsorption processes have been suggested wherein the regeneration of the primary selective adsorbers and/or guard adsorbers employ a portion of the substantially purified void space light gas from a selective adsorber whose adsorptive capacity has not been fully occupied by adsorbed heavier components but a portion of which adsorbent pores or "void space" is occupied by purified light gas, particularly that portion of the adsorbent at the downstream end of the adsorber. Such substantially purified light gas for regeneration can be stored in a separate vessel as taught by U.S. Pat. No. 3,142,547 of Marsh et al, or it can be used directly in a system of four or more sequenced adsorber beds as taught by U.S. Pat. No. 3,430,418 of Wagner. Although such improved selective adsorption processes have reduced the amount of purified light gas product utilized for regeneration and repressuring and have increased the recoveries of the desired light gas product, the light gas disposed of along with the desorbed and purged components represents loss of desired product. Thus, further improved recoveries of purified light gas product are desired.

It has also been suggested to employ a low temperature separator unit in conjunction with a pressure swing adsorption unit with recompression of the regenerating gas mixture from the adsorbers and recycle to the low temperature separator unit as taught by U.S. Pat. No. 3,838,553 of Doherty. Such systems are complicated and costly, requiring an attendant refrigeration system for operation of the low temperature separation unit. Hence, such systems have not been widely used.

There has now been developed a selective adsorption process which produces both high purity light gas and a high yield of such gas from the gas mixture or mixtures containing the light gas. The process involves the use of a recovery system comprising a light gas selective permeator and a selective adsorption unit with recycle of a substantial portion of the light gas separated by the permeator to the selective adsorption unit for recovery or reuse.

SUMMARY

In accordance with the invention, there is provided a process for recovering a light gas in both high purity and high yield from a gas mixture containing such light gas which comprises:
- directing the gas mixture to a selective adsorption unit and recovering a high purity light gas therefrom,
- obtaining from said selective adsorption unit a purge gas containing said light gas,
- directing said purge gas from the selective adsorption unit to a membrane permeator selectively permeable to the light gas, recovering a permeated gas comprising light gas of improved purity from said permeator, and recycling the permeated gas to the selective adsorption unit.

The non-permeated gas mixture comprised of adsorbed gases and a small proportion of the light gas is recovered for other use or disposed of as desired.

The present invention has the advantage of recovering a high yield, frequently 90 percent greater, of the desired high purity light gas product. Additionally, such added recovery often is accomplished with a minimum of additional energy expended on the purge gas from which the added recovery is made. A further advantage is the fact that the process of the present invention can be carried out with selective adsorption units already in place or in use by addition of a system for improved light gas recovery, comprising a membrane permeator unit and related equipment. In this way such existing selective adsorption units can afford a substantially increased yield of the desired light gas product. The increased cost of fuels, both as potential sources of light gases and for the generation of process energy make the increased recovery of such light gases, particularly hydrogen, without the necessity to totally replace previously used lower yielding units very attractive in the petrochemical and refining industries. Hereinafter the present invention will be described with reference to hydrogen as the recovered light gas, although it is understood to be applicable to the recovery of such other light gas as helium in high purity as well.

BRIEF DESCRIPTION OF THE DRAWING

FIG. 1 is a schematic process flow diagram illustrating one embodiment of the present invention with alternative recovered gas flow shown in dotted lines.

DESCRIPTION OF THE PREFERRED EMBODIMENTS

As feed gas to the process there can be employed any gas mixture containing a substantial proportion of hydrogen which is desired to be recovered in relatively highly pure form. Such gas mixtures may be derived from processes in which hydrogen is a reactant or product as hydrogenations, hydrocarbon or ammonia syntheses, dehydrogenations, catalytic or thermal, condensation reactions with hydrogen as a by-product, controlled combustion or reforming of hydrocarbons and cracking of hydrocarbons, catalytic or thermal, with hydrogen as a product gas.

Referring to FIG. 1 a feed gas mixture is directed by conduits 1 and 21 to a selective adsorption unit represented schematically by a single guard adsorber 2 and a single primary selective adsorber 3. Generally the feed gas mixture will not be available at the desired elevated pressure for supplying the selective adsorption process. Therefore it is usually first compressed in compressor 4. It will be apparent that compressor 4 is not required when the feed gas mixture is available at the desired or a higher pressure to supply the selective adsorption process. Generally, such selective adsorption processes require that the feed gas mixture be at a pressure of from about 3.4 to 54.4 atmospheres (50 to 800 psi) or higher, and preferably from about 20.4 to 34.0 atmospheres (300 to 500 psi). Ambient temperatures are generally satisfactory for operation of the selective adsorption unit. If a heated gas mixture is to be used it is frequently desirable to cool such gas below 100° C. and preferably below about 50° C. prior to recovery of its hydrogen content. A high purity hydrogen product gas is produced as effluent from the selective adsorption unit and directed to storage or use by conduit 5. Such product gas is the combined effluent of purified hydrogen from each of the plurality of primary selective adsorbers.

When the adsorbent bed of primary selective adsorber 3 is loaded as desired the feed stream in conduit 21 is switched to another pair of the plurality of guard adsorbers and primary selective adsorbers. Thereupon the purified void space hydrogen in adsorber 3 is generally recovered by lowering the pressure on the exit in the direction of flow of the adsorption step to direct a portion of the purified void space hydrogen to one of the other parallel selective adsorbers for repressurization of that other adsorber. A second portion of the void space hydrogen is directed to a second parallel selective adsorber for partial or complete purging of the second adsorber. Adsorber 3 then requires desorption of adsorbed gases, purging and repressurization.

Desorption, or blowdown, is generally accomplished by adjusting to a lower pressure at the inlet for normal flow, i.e., the gas flow is countercurrent to normal flow, and passing the desorbed gases, the residue of void space hydrogen and the residue of charged feed gas out of adsorber 3 and via conduit 7 for disposal or further treatment. It is generally preferred to direct the desorbed gases from adsorber 3 into the same header and thence into conduit 7 which takes the subsequent flow of purging gas from adsorber 3. Operation in this manner will ensure that all the desired hydrogen present in adsorber 3 at the commencement of desorption will be directed to the membrane permeator unit for potential recovery. Adsorber 3 is then purged, usually at the same or a lower pressure, by means of a purging gas of substantially purified hydrogen product.

The purging gas comprising substantially purified hydrogen can comprise a portion of the product hydrogen from any adsorber then carrying out adsorption or from a collecting manifold, header or conduit such as conduit 5 for such product gas. It can comprise a substantially purified hydrogen from an external source such as storage or another process. Purging gas can also comprise a portion of the substantially purified void space hydrogen from another primary selective adsorber in the well known manner of the prior art. When such void space hydrogen is used as purging gas for adsorber 3 it is generally taken from the product outlet of another adsorber, i.e., in a flow direction cocurrent with the flow of product gas during the adsorption of such other adsorber. Conduit 6 constitutes a schematic illustration of the means to direct such purging gas to adsorber 3 from whichever of the above sources is desired. Alternatively, as is discussed below, recovered permeated hydrogen may constitute a portion or all of the purging gas and in that instance would be directed by conduit 8 to adsorber 3.

In the selective adsorption or pressure swing adsorption processes of the prior art it is generally preferred to reduce the purging gas to a very low pressure, whether that gas is a portion of the hydrogen product, a portion of the void space hydrogen, or from an external source, in order to facilitate desorption of the adsorbed gases and to decrease the proportion of hydrogen required as purging gas. Pressure reduction by any convenient means can be carried out in the present process. Since a very large proportion of the purging gas hydrogen is recovered, however, it is not essential that such pressure reduction of the purging gas be carried to the same extent to minimize use of hydrogen as purging gas as in the prior processes. Thus, the primary adsorber to be purged can be reduced in pressure in one or more steps to desorb a portion of the adsorbed heavier gases and the hydrogen purging gas can be admitted to sweep out the remainder at the last such pressure or any further reduced pressure by adjusting the flow rate of the purging gas.

In the instance of the use of a guard adsorber 2 in advance of the primary selective adsorber 3, there is taken an additional, generally smaller, portion of hydrogen from the hydrogen product, the void space hydrogen or an external source and such portion is directed by conduit 9 to the guard adsorber 2 as a separate purging gas for removal of the heavy contaminants adsorbed on guard adsorber 2. The separate purge gas exiting from guard adsorber 2 containing the desorbed contaminants is usually rejected from the process and disposed of via conduit 10. If desired, however, it too may be recovered by suitable treatment such as by an additional membrane separation. The separate purging gas from the guard adsorbers is generally a much smaller proportion of the substantially purified hydrogen product than the purge gas from the primary selective adsorbers and hence its rejection from the process and disposal usually does not constitute substantial loss in total yield of light gas. Alternatively, as discussed below, recovered permeated hydrogen may constitute all or a portion of the guard adsorber separate purging gas stream being directed thereto by conduit 11.

The purge gas from the primary selective adsorbers preferably joined with the desorbed gases, forms the regenerating gas which is subjected to separation by the membrane permeator unit 16. The term "regenerating gas" embraces both the purge gas alone if the desorbed gases are separately disposed of, and the mixed purge gas and desorbed gases, and is preferred. It is desirable to initially direct the regenerating gas to a holding tank 12, since each cycle of each adsorber bed will cause the pressure to vary over a wide range which can extend from as low as atmospheric up to pressures approaching that of the product gas, and such surges and drops in pressure are advantageously damped for further processing. Therefore a regenerating gas holding tank 12 of a capacity suitable to accommodate the desorbed gases, or blowdown, and purge gas from the multiple primary adsorbers is provided. The gas holding tank 12 is normally maintained at approximately the lowest pressure of the purge gas. When desorption and purging of the selective adsorbers is carried out at final pressure of about 3 atmospheres or greater the regenerating gas may be separated and the hydrogen content recovered by membrane permeator 16 and the recovered hydrogen may be recycled to the selective adsorption unit without additional compression. When operating in such manner the compressor 13 and high pressure holding tank 15 are not essential. Such a manner of operation is contemplated within the present invention.

In order to provide for the most efficient separation of the regenerating gas and utilization of the recovered hydrogen gas it is usually preferred to bring the regenerating gas to a higher pressure such as by means of compressor 13. The compressor 13, which can be an automatic loading/unloading compressor to accommodate periods of low or no flow of gas from the holding tank 12, is designed to repress the regenerating gas for separation and recovery of the hydrogen content and recycle of such recovered hydrogen to the selective adsorption unit. The regenerating gas is repressured to an elevated pressure of from about 3 to 50 atmospheres (45 to 735 psi) or higher, and preferably from about 5 to 35 atmospheres (75 to 515 psi), and passed to a high pressure holding tank or surge tank 15. The high pressure holding tank 15 is suitably sized to accommodate periods of low or no input gas flow from the compressor 13 and to supply a relatively continuous flow of the repressured regenerating gas to the membrane permeator unit 16. It is frequently desirable to provide an oil removal filter, not shown, in line 14 from the compressor 13 to the high pressure holding tank 15 to insure that the repressurized regenerating gas is not contaminated with entrained oil from the system. A knockout tank can also be provided in line 14 if desired. Often it is also desirable to incorporate a filter for particulate matter, not shown, before the compressor 13 to remove any solids which might be present.

The membrane permeator unit 16 provides for separation of a substantial proportion of the hydrogen gas present in a regenerating gas mixture from the heavier gases also present. The nature of such heavier gas will vary depending upon the source of the feed gas mixture to the present process. The heavier gases can comprise one or more of nitrogen, carbon monoxide, carbon dioxide, methane, ethane and traces of higher, normally liquid hydrocarbons, aliphatic or aromatic, which were not adsorbed in the guard adsorbers. The membrane permeator unit 16 is provided with semipermeable membranes selectively permeable to hydrogen, or to helium when that is the light gas being recovered, in preference to the heavier gases.

The membrane permeator unit 16 consists of one or more membrane permeators comprising semipermeable membranes mounted in a suitable housing and provided with manifolds and associated with an inlet and separate outlets for non-permeated and permeated gas mixtures. Desirably the membrane permeators take the form of hollow fiber membrane permeators wherein the fibers are mounted in a shell which is provided with an inlet and outlets and manifolded so that the regenerating gas under pressure is supplied either to the bores of the fibers or, more preferably, to the outside or shell side of the hollow fiber membranes. The non-permeated gas mixture is withdrawn from manifolds at the opposite ends of the fiber bores or of the shell and the permeated gas is withdrawn from the opposite fiber surfaces, i.e., from the fiber bores if the regenerating gas is fed to the shell. Most desirably the hollow fiber membrane permeators will provide for shell side axial or radial flow of the regenerating gas feed with removal of the non-permeated gas mixture from a remote point of the shell and recovery of the permeated gas from the bores of the fibers. Either cocurrent or countercurrent flow of the regenerating gas feed and the hydrogen-rich permeated gas can be employed, with countercurrent flow usually being preferred.

Generally the selectivity or separation of a membrane is described in terms of the ratio of the permeability of the fast permeating gas, i.e., hydrogen, to the permeability of the slower permeating gas, such as carbon monoxide or methane, wherein the permeability (P/1) of the particular gas through the membrane can be defined as the volume of gas at standard temperature and pressure which passes through the membrane per square centimeter of separating surface area per second for a partial pressure drop of one centimeter of mercury across the membrane. The ratio of the permeabilities of the two specific gases is referred to as the separation factor of the first gas in respect to the second gas (S.F. $H_2/CO$ or $\alpha H_2/CO$). Desirably, the separation factor for hydrogen over carbon monoxide or methane will be at least 5 and preferably at least about 10. Separation factors for hydrogen over carbon monoxide or methane of 50 or 100 or greater may be provided by certain membranes. Particularly desirable membranes exhibit hydrogen permeabilities of at least $1 \times 10^{-6}$ and preferably from $1 \times 10^{-5}$ to $4 \times 10^{-4}$ cubic centimeters of hydrogen at standard temperature and pressure per square centimeter of membrane surface area per second at a partial pressure drop of one centimeter of mercury across the membrane.

The partial pressure differential of hydrogen across the membrane provides the driving force for the permeation of hydrogen and depends upon the concentration of hydrogen as well as the total gas pressures on each side of the membranes. Generally, the regenerating gas will be supplied to the membrane permeator unit at a pressure of from about 3 to 50 atmospheres. Preferably, the regenerating gas will be supplied at a pressure of about 5 to 35 atmospheres. The pressure on the permeated recovered gas generally will range from 0.1 to 45 atmospheres, and preferably from about 1.5 to 10 atmospheres. Thus, the differential in pressure maintained between the regenerating or non-permeated gas mixtures and the permeated gas on the opposite side of the membranes may range from about 2 to 49 atmospheres and preferably will range from about 5 to 34 atmospheres.

The membrane permeator unit 16 provides two effluent gas streams, the permeated gas removed by conduit 17 and comprising a relatively pure recovered hydrogen gas and the non-permeated gas mixture removed by conduit 18 and comprising a small proportion of the hydrogen and the great preponderance of the heavier gases desorbed from the primary selective adsorbers. The latter non-permeated gas mixture is suitable for use in any convenient process, for fuel gas or for disposal by flaring or venting. It may be conveniently reduced in pressure by a pressure reduction means 19 and directed to any desired use or to flaring via conduit 10 or by separate piping, if desired. This non-permeated gas mixture is a small fraction of the volume of the gases normally directed to disposal from a conventional selective adsorption process.

The permeated or recovered hydrogen gas often comprising hydrogen of greater than 90 percent and frequently greater than 95 percent purity is suitable for return to the selective adsorption unit. This can take place in at least two different ways. The relatively pure recovered hydrogen can be directed via conduits 17 or 20 to the mixture in conduits 21 or 1 or to the manifold of the selective adsorption unit for recovery of the additional hydrogen as added highly purified hydrogen product. Generally, the regenerating gas directed to permeator unit 16 will be compressed to a sufficient pressure so that when the pressure differential maintained across the permeable membranes of the permeator unit 16 is considered, the recovered hydrogen is at substantially the same elevated pressure as the feed gas mixture to the selective adsorption unit and can be blended with such feed gas mixture in conduit 21. If the recovered hydrogen is not at a sufficient pressure to blend with the feed gas mixture it can be further compressed or it can be blended with the feed gas mixture in conduit 1 or in a surge tank supplying conduit 1 prior to compression of the feed gas mixture.

Alternatively, the recovered hydrogen gas can be employed as purging gas for the primary adsorbers or the guard adsorbers. For this purpose it can be supplemented, if desired, with a small proportion of the purified product gas or void space gas. In this way the replaced proportion of the purified product gas or void space gas required by previous processes as purging gas represents added highly purified hydrogen product available for its intended uses. For operation in this way the recovered hydrogen gas is directed via conduits 17 and 22 to gas holding tank 23, where it is maintained at the desired pressure for use as purging gas. From holding tank 23 the recovered hydrogen gas can be directed to the guard adsorbers via conduit 11 or to the primary selective adsorbers via conduit 8 as required for purging by the sequenced cycle of the adsorbers.

In this latter alternative the recycled regenerating gas is purified by separation and removal by the membrane permeator unit of the desorbed heavier gases swept from the primary selective absorbers, and thus rendered suitable as purging gas for the primary adsorbers. Since the purging gas is desirably used at relatively low pressures, the regenerating gas need only be compressed sufficiently to maintain the desired pressure differential across the membrane permeator unit and the relatively low pressure recovered hydrogen gas is suitable for use as purging gas to the primary selective absorbers. This serves to minimize compression costs.

Any suitable material selectively permeable to hydrogen as compared to the heavier gases such as carbon monoxide, methane, nitrogen and other gases may be employed for the separation membranes and the preferred hollow fiber separation membranes. Suitable membrane materials include metallic and inorganic membranes as well as organic polymers or organic polymers mixed with inorganics such as fillers, reinforcements and the like. Typical organic polymers which are suitable for the formation of planar and hollow fiber membranes can be substituted or unsubstituted polymers and may be selected from polysulfones; polystyrenes, including styrene-containing polymers such as acrylonitrile-styrene copolymers, styrene-butadiene copolymers and styrene-vinylbenzyl halide copolymers; polycarbonates; cellulosic polymers, such as cellulose acetate, cellulose acetate-butyrate, cellulose propionate, ethyl cellulose, methyl cellulose, nitrocellulose, etc.; polyamides and polyimides, including aryl polyamides and aryl polyimides; polyethers; polyarylene oxides, such as polyphenylene oxide and polyxylylene oxide; polyesteramide diisocyanates; polyurethanes; polyesters, including polyacrylates, such as polyethylene terephthalate, polyalkyl methacrylates, polyalkyl acrylates, polyphenylene terephthalate, etc.; polysulfides; polymers from monomers having α-olefinic unsaturation other than mentioned above such as polyethylene, polypropylene, polybutene-1, poly-4-methylbutene-1; polyvinyls, e.g., polyvinylchloride, polyvinylfluoride, polyvinylidene chloride, polyvinylidene fluoride, polyvinyl alcohol, polyvinyl esters such as polyvinyl acetate and polyvinyl propionate, polyvinyl pyridines, polyvinyl pyrrolidones, polyvinyl ethers, polyvinyl ketones, polyvinyl aldehydes such as polyvinyl formal and polyvinyl butyral, polyvinyl amines, polyvinyl phosphates and polyvinyl sulfates; polyallyls; polytriazoles; polybenzimidazoles; polycarbodiimides; polyphosphazines; etc., and interpolymers including block interpolymers containing repeating units from the above such as terpolymers of acrylonitrile-vinylbromide-sodium salt of p-sulfophenylmethallyl ether; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

The membrane material is preferably as thin as possible in order to improve the rate of permeation through the membrane, yet of sufficient thickness to insure adequate strength to the membrane to withstand the separation conditions, including differential pressures and differential partial pressures employed. Membranes and hollow fiber membranes may be isotropic, i.e., have substantially the same density throughout, or they may be anisotropic, i.e., having at least one zone of greater density than at least one other zone of the membranes. The membranes may be chemically homogeneous, i.e., constructed of the same material, or they may be composite membranes. Suitable composite membranes may comprise a thin layer which effects the separation on a porous physical support which provides the necessary strength to the composite membrane to withstand the separation. Particularly preferred composite membranes are the multicomponent membranes disclosed by Henis et al, in United States patent application Ser. No. 832,481, filed Sept. 13, 1977 and commonly assigned. These membranes comprise a porous separation membrane which substantially effects the separation and a coating material in occluding contact with the porous separation membrane wherein the material of the coating does not substantially effect the separation. These multicomponent membranes are particularly attractive for gas separations wherein hydrogen is separated from carbon monoxide, methane, nitrogen and other heavier gases in that good selectivity for separation and high flux of hydrogen through the membranes can be obtained.

The materials for the coating of these multicomponent membranes may be natural or synthetic substances, and are often polymers, which advantageously exhibit the appropriate properties to provide occluding contact with the porous separation membrane. Synthetic substances include both addition and condensation polymers. Typical of the useful materials which can comprise the coating are polymers which can be substituted or unsubstituted and which are solid or liquid under gas separation conditions, and include synthetic rubbers; natural rubbers; relatively high molecular weight and/or high boiling liquids; organic prepolymers; polysiloxanes, silicone polymers; polysilazanes; polyurethanes; polyepichlorohydrins; polyamines; polyimines; polyamides including polylactams; acrylonitrile-containing copolymers such as poly (α-chloroacrylonitrile) copolymers; polyesters including polyacrylates, e.g., polyalkyl acrylates and polyalkyl methacrylates, wherein the alkyl groups have from 1 to about 8 carbon atoms, polysebacates, polysuccinates, and alkyd resins; terpenoid resins; linseed oil; cellulosic polymers; polysulfones, especially aliphatic-containing polysulfones; polyalkylene glycols such as polyethylene glycol, polypropylene glycol, etc.; polyalkylene polysulfates; polypyrrolidones; polymers from monomers having olefinic unsaturation such as polyolefins, e.g., polyethylene, polypropylene, polybutadiene, poly(2,3-dichlorobutadienes), polyisoprene, polychloroprene; polystyrene, including polystyrene copolymers, e.g., styrene butadiene copolymers; polyvinyls such as polyvinyl alcohol, polyvinyl aldehydes, e.g., polyvinyl formal and polyvinyl butyral, polyvinyl ketones, e.g., polymethylvinyl ketone, polyvinyl esters, e.g., polyvinyl benzoates, polyvinyl halides, e.g., polyvinyl bromide; polyvinylidene halides; polyvinylidene carbonates; poly(N-vinylmaleamide); etc., poly(1,5-cyclooctadiene); poly(methylisopropenyl ketone); fluorinated ethylene copolymers; polyarylene oxides, e.g., polyxylylene oxides; polycarbonates; polyphosphates, e.g., polyethylene methyl phosphate; and the like, and any interpolymers including the interpolymers containing repeating units from the above, and grafts and blends containing any of the foregoing. The materials may or may not be polymerized after application to the porous separation membrane.

The present invention also comprehends the system of apparatus for effecting the improved selective adsorption process described above. In one aspect of the invention such a system embraces both a selective adsorption unit, a membrane permeator unit and associated gas transfer means and ancillary equipment. The selective adsorption unit has been described above as having a plurality of selective adsorbers, at least one gas inlet, a first outlet for the tight gas product, and a second outlet for purge gas or regenerating gas. The membrane permeator unit has also been described above as comprising a plurality of membranes selectively permeable to the light gas to be recovered, and having a gas inlet, a first outlet for a permeated gas and a second outlet for a non-permeated gas. The associated gas transfer means and ancillary equipment, including guard adsorbers, compressors, pressure reducers, holding tanks, filters and conduits or piping, both as illustrated diagramatically in the drawing and not shown, are of conventional design and function. Any convenient type of such apparatus can be employed.

In its broadest aspect and in that aspect of the invention which comprehends the improvement in the recovery of a light gas by means of a system associated with an existing selective adsorption unit, the system embraces a membrane permeator unit as described above and associated gas transfer means and ancillary equipment. The existing selective adsorption unit can be of any design having a plurality of selective adsorbers as more fully described above. The membrane permeator unit, gas transfer means and ancillary equipment is as described above.

The following examples are provided to further illustrate the invention.

EXAMPLE I

A selective adsorption unit or pressure swing adsorption unit was operated to recover a purified hydrogen gas from a feed gas mixture vented from a hydrogen generating thermal reaction of benzene. The adsorption unit comprised four primary adsorbers operated sequentially and each preceded by a guard adsorber from which purge gas was separately vented, as well as an associated surge tank, compressor and knock-out drum for condensed liquids in the feed gas mixture. The regenerating gas of desorbed heavier gases and hydrogen purge gas obtained from the selective adsorption unit was split into two portions. The major portion was directed to venting. A small slip stream was collected in a holding tank at about 2.4 atmospheres. A stream of this regenerating gas was taken from the holding tank and directed to a permeator at ambient temperatures, which varied from about 0° to 25° C. It was raised to a sufficient pressure to maintain a pressure differential across the permeator of from about 8.5 to 20.4 atmospheres (125 to 300 psig). The permeator separated a substantial proportion of the hydrogen content of the regenerating gas, as permeated hydrogen gas while rejecting a substantial proportion of the carbon monoxide and methane content as non-permeated gas mixture. The permeated hydrogen gas was suitable for recovery as purified hydrogen product by recycle to the line or surge tank supplying the feed gas mixture to the selective adsorption unit.

The permeator contained poly(siloxane)-coated anisotropic polysulfone hollow fiber membranes prepared substantially in accordance with the method disclosed in Example 64 of U.S. patent application Ser. No. 832,481, filed Sept. 13, 1977 of Henis et al from polysulfone having a molecular weight in excess of 10,000 and a poly(siloxane) having a molecular weight in excess of 1,000 prior to crosslinking. The polysulfone hollow fiber porous separation membranes, which were coated on the outside surface with poly(siloxane) in occluding contact with such surface, had an outside diameter of approximately 500 microns, an inside diameter of approximately 250 microns and a wall thickness of approximately 125 microns. The membranes in the permeator had an effective surface area of approximately 5500 square centimeters. The regenerating gas was contacted with the outer surfaces of the hollow fiber membranes in axial flow and the permeated gas withdrawn from the bores of the hollow fibers.

The permeabilities of the three major gases present in the regenerating gas were determined in a series of measured runs extended over a period of three months of total operation of the permeator on this regenerating gas. The test runs were conducted at pressure differentials of from 8.5 to 13.6 atmospheres and ambient temperatures of from 0° C. to 20° C. The permeabilities determined were normalized to a 20° C. temperature by extrapolating the measured values. The effective permeabilities determined for each gas in a series of test runs expressed in P/1 (gas) $\times 10^6$ at 20° C. and separation factor expressed as $\alpha H_2$/gas are set out in Table 1A below. It is apparent that a permeated gas substantially concentrated in hydrogen and substantially reduced in carbon monoxide and methane content was produced.

TABLE 1A

| Permeabilities and Separation Factors at 20° C. | | | | | |
|---|---|---|---|---|---|
| Run | $(P/1)H_2 \times 10^6$ | $(P/1)CO \times 10^6$ | $\alpha H_2/CO$ | $(P/1)CH_4 \times 10^6$ | $\alpha H_2/CH_4$ |
| A | 47.8 | 1.51 | 31.6 | 1.48 | 32.1 |
| B | 55.1 | 1.93 | 28.6 | .96 | 57.4 |
| C | 61.3 | 1.78 | 34.4 | 1.41 | 43.5 |
| D | 58.5 | 2.23 | 26.2 | 2.00 | 29.2 |
| E | 63.9 | 2.85 | 22.4 | 2.52 | 25.3 |
| F | 25.5 | 1.48 | 30.7 | 1.15 | 39.6 |
| G | 42.7 | 1.55 | 27.6 | 1.09 | 39.2 |
| H | 49.4 | 1.48 | 33.4 | 1.05 | 47.0 |

Prior to placing on stream and after three months of operation on the regenerating gas the same hollow fiber permeator was tested with each of pure hydrogen and carbon monoxide gases separately. The permeabilities (P/1) of each gas, the percent change in P/1, and the separation factor ($\alpha H_2/CO$) of hydrogen in respect to carbon monoxide before and after the test period as determined with the separate pure gases are set out in Table 1B below. It is apparent that although the permeabilities to the individual gases had been reduced by approximately 25 percent by three months of operation the performance as determined by separation factor was essentially unchanged.

TABLE 1B

| Permeabilities and Separation Factor at 30° C. | | | |
|---|---|---|---|
|  | Prior to Test | After Test | % Change |
| $(P/1)H_2 \times 10^6$ | 80.0 | 58.8 | −26.6 |
| $(P/1)CO \times 10^6$ | 2.20 | 1.65 | −25.0 |
| $\alpha_{CO}^{H_2}$ | 36.4 | 35.6 | — |

EXAMPLE II

The selective adsorption unit described in Example I is operated so as to recover high purity hydrogen gas containing less than 25 ppm each of carbon monoxide and methane from the vented gas mixture from the hydrogen-generating thermal reaction of benzene. When thus operating the conventional selective adsorption unit, approximately 576 Standard Cubic Meters (20200 SCF) of such feed gas mixture is processed to separate and forward for use in another process 45.4 kg. (100 pounds) of hydrogen as 510 SCM (17900 SCF) of purified gas. The composition is determined and shown in Table 2 of the regenerating gas obtained by desorbing and purging of the primary selective adsorbers expressed as kg. of each named constituent per each 45.4 kg. of purified hydrogen forwarded by the selective adsorption unit. The compositions expressed as above of a permeated recovered hydrogen gas and of a non-permeated gas mixture for disposal are determined based upon computer calculations when employing a membrane permeator unit composed of identical hollow fiber membranes to those described in Example I. The membrane permeator unit comprises two parallel permeators each having a surface area of approximately 93 square meters for a total surface area of approximately 186 square meters. The regenerating gas is collected in a low pressure holding tank at about 2.4 atmospheres, compressed to approximately 21 atmospheres and then passed through the membrane permeator unit at a temperature of from 20° to 30° C. The differential in pressure between the compressed regenerating gas and the permeated gas is maintained at about 13.6 atmospheres. The compositions of the regenerating gas, the permeated recovered hydrogen gas and the non-permeated gas mixture in kg. per 45.4 kg. of hydrogen product are set out in Table 2 below.

TABLE 2

| Compositions of Gas Streams, kg. | | | |
|---|---|---|---|
|  | Regenerating Gas | Permeated Gas | Non-Permeated Gas |
| $H_2$ | 22.7 | 20.3 | 2.39 |
| CO | 23.4 | 3.62 | 19.81 |
| $CH_4$ | 24.3 | 2.83 | 21.48 |

The permeated recovered hydrogen gas comprising 97.1 Vol.% hydrogen is directed to a surge tank supplying the compressor for the initial feed gas mixture and serves to increase the feed flow to the selective adsorption unit. The additional 20.3 kg. of hydrogen thereby recovered as purified hydrogen product represents an increase from the conventional 45.4 kg. of 44.7% in yield of highly purified hydrogen gas and a recovery of approximately 90% based on the hydrogen content of the feed gas mixture. The non-permeated gas mixture from the permeator unit is suitably recovered by blending with general process fuel gas and the heating value thereof thus utilized.

Alternatively, the permeated recovered hydrogen gas can be recycled via a holding tank to supply hydrogen gas for purging the primary selective adsorbers and/or the guard adsorbers. When so utilized the recovered hydrogen gas replaces an equal amount of highly purified hydrogen product for this purpose and the hydrogen product not required represents added yield of the highly purified hydrogen product.

Concentration of adsorbed gases in the non-permeated gas mixture effected by the present process and the resulting simplified recovery of such concentrated gases constitutes an additional advantage of the process. It will be evident that when a light gas is to be recovered from a two component gas mixture, the other gas separated can be recovered in high concentration suitable for any desired use.

Although preferred embodiments of the invention have been described in detail, it is contemplated that modifications of the process may be made and that some features may be employed without others, all within the spirit and scope of the invention.

What is claimed is:

1. In a selective adsorption process wherein a feed gas mixture having a light gas component is directed to a selective adsorption unit, a product light gas is obtained from said selective adsorption unit and a purge gas comprising light gas is obtained from said selective adsorption unit, the improvement comprising directing said purge gas to a membrane permeator selectively permeable to said light gas, recovering from said permeator permeated gas comprising said light gas of a higher concentration than in said purge gas and directing said permeated gas to said selective adsorption unit.

2. The process of claim 1 wherein said permeated gas is combined with said feed gas mixture.

3. The process of claim 1 wherein said permeated gas is utilized to purge at least one selective adsorber of said unit.

4. The process of claim 1 wherein the purge gas is directed to said membrane permeator at an elevated pressure of from about 3 to 50 atmospheres.

5. The process of claim 4 wherein the purge gas is compressed to said elevated pressure.

6. The process of claim 1 wherein said light gas is hydrogen.

7. The process of claim 1 wherein the selective adsorption unit is desorbed of at least one adsorbed gas, said desorbed gas and said purge gas are mixed to form regenerating gas and said regenerating gas is directed to said membrane permeator.

8. The process of claim 7 wherein the regenerating gas is directed to said membrane permeator at an elevated pressure of from about 3 to 50 atmospheres.

9. The process of claim 8 wherein the regenerating gas is compressed to said elevated pressure.

10. The process of claim 7 wherein said light gas is hydrogen.

11. In a selective adsorption process wherein a feed gas mixture containing hydrogen is directed to a selective adsorption unit, product hydrogen is obtained from the selective adsorption unit, the selective adsorption unit is sequentially desorbed of at least one absorbed gas, sequentially purged with a gas comprising hydrogen and said desorbed gas and purge gas are joined to form regenerating gas, the improvement comprising directing said regenerating gas to a membrane permeator selectively permeable to hydrogen, recovering from said permeator permeated gas comprising hydrogen of a higher concentration than in said regenerating gas and directing said permeated gas to said selective adsorption unit.

12. The process of claim 11 wherein said permeated gas is combined with said feed gas mixture.

13. The process of claim 11 wherein said permeated gas is utilized to purge a selective adsorber.

14. The process of claim 11 wherein said regenerating gas is directed to said membrane permeator at an elevated pressure of from about 3 to about 50 atmospheres.

15. The process of claims 1 or 11, wherein said membrane permeator is comprised of multi-component hollow fiber membranes.

16. The process of claim 15 wherein said multicomponent hollow fiber membranes comprise a porous hollow fiber separation membrane and a coating in occluding contact with at least one surface thereof.

17. The process of claim 16 wherein said porous hollow fiber separation membrane comprises polysulfone and said coating comprises poly(siloxane) crosslinked to provide a silicone rubber, said coating in occluding contact with the outside surface of said porous hollow fiber separation membrane.

18. The process of claims 1 or 11 wherein a nonpermeated gas mixture is recovered from said membrane permeator.

19. The process of claim 19 wherein the non-permeated gas mixture is burned as fuel.

20. A system for improving recovery of a light gas by a selective adsorption unit having a plurality of selective adsorbers, at least one gas inlet, a first outlet for a product comprising a light gas, a second outlet for purge gas, means for feeding a gas mixture to a feed gas inlet and means for recovering a product light gas from the first outlet of said selective adsorption unit, said system comprising: a membrane permeator unit comprising a plurality of membranes selectively permeable to said light gas, having a gas inlet, a first outlet for permeated gas and a second outlet for a non-permeated gas mixture, means for directing the purge gas from the second outlet of said selective adsorption unit to the gas inlet of the membrane permeator unit, and means for directing the permeated gas from the first outlet of the membrane permeator unit to at least one of said feed gas inlet or a purging gas inlet of said selective adsorption unit.

21. A system for improved recovery of a light gas, said system comprising: a selective adsorption unit having a plurality of selective adsorbers, at least one gas inlet, a first gas outlet for product comprising light gas and a second gas outlet for purged gas, a membrane permeator unit comprising a plurality of membranes selectively permeable to said light gas, having a gas inlet, a first outlet for permeated gas and a second outlet for non-permeated gas mixture, means for feeding a gas mixture to a feed gas inlet of said selective adsorption unit, means for recovering product light gas from the first outlet of said selective adsorption unit, means for directing the purge gas from the second outlet of the selective adsorption unit to the gas inlet of the membrane permeating unit, and a means for directing the permeated gas from the first outlet of the membrane permeator unit to at least one of said feed gas inlet or a purging gas inlet of the selective adsorption unit.

22. The system of claims 20 or 21 wherein said means for directing the purge gas comprises (a) a gas holding tank, (b) conduit means from said selective adsorption unit to the gas holding tank, (c) a gas compressor, (d) conduit means from said gas holding tank to said gas compressor and (e) means for directing the purge gas from said gas compressor to the gas inlet of said membrane permeator unit.

23. The system of claim 22 wherein said means for directing the purge gas from said gas compressor comprises (a) a compressed gas holding tank, (b) conduit means from said compressor to said compressed gas holding tank and (c) conduit means from said compressed gas holding tank to the gas inlet of said membrane permeator unit.

24. The system of claims 20 or 21 wherein said means for directing the permeated gas from the first outlet of the membrane permeator unit comprises conduit means from said first outlet of the membrane permeator unit to said means for feeding a gas mixture to a feed gas inlet of said selective adsorption unit.

25. The system of claims 20 or 21 wherein said means for directing the permeated gas from the first outlet of the membrane permeator unit comprises (a) a gas holding tank (b) conduit means from said first outlet of the membrane permeator unit to the gas holding tank and (c) conduit means from said gas holding tank to a purging gas inlet of said selective adsorption unit.

26. The system of claims 20 or 21 comprising in addition means for directing the non-permeated gas mixture from the second outlet of the membrane permeator unit to a fuel gas conduit.

27. The system of claims 20 or 21 wherein said membrane permeator unit is comprised of multicomponent hollow fiber membranes.

28. The system of claim 27 wherein said multicomponent hollow fiber membranes comprise a porous hollow fiber separation membrane and a coating in occluding contact with at least one surface thereof.

29. The system of claim 28 wherein said porous hollow fiber separation membrane comprises polysulfone and said coating comprises poly(siloxane) crosslinked to provide a silicone rubber, said coating in occluding contact with the outside surface of said porous hollow fiber separation membrane.

* * * * *

UNITED STATES PATENT AND TRADEMARK OFFICE
CERTIFICATE OF CORRECTION

PATENT NO. : 4,238,204
DATED : December 9, 1980
INVENTOR(S) : Eli Perry

It is certified that error appears in the above-identified patent and that said Letters Patent are hereby corrected as shown below:

In Column 1, line 55, "or" should read --of--.

In Column 1, line 64, "product" should read --produce--.

In Column 3, line 5, after percent add --or--.

In Column 10, line 22, "tight" should read --light--.

In Column 14, line 38, "19" should read --18--.

Signed and Sealed this

Seventeenth Day of March 1981

[SEAL]

Attest:

RENE D. TEGTMEYER

Attesting Officer    Acting Commissioner of Patents and Trademarks